US006801529B1

United States Patent
McGrane et al.

(10) Patent No.: US 6,801,529 B1
(45) Date of Patent: Oct. 5, 2004

(54) METHOD AND SYSTEM FOR SENDING MESSAGES TO MULTIPLE LOCATIONS IN A CONTROL SYSTEM

(75) Inventors: William B. McGrane, Dallas, TX (US); Mark R. Lee, Richardson, TX (US); Mark S. Lewno, Garland, TX (US)

(73) Assignee: AMX Corporation, Richardson, TX (US)

( * ) Notice: Subject to any disclaimer, the term of this patent is extended or adjusted under 35 U.S.C. 154(b) by 0 days.

(21) Appl. No.: 09/328,040

(22) Filed: Jun. 8, 1999

(51) Int. Cl.[7] .......................... H04L 12/28; H04L 12/56
(52) U.S. Cl. ...................................... 370/390; 370/432
(58) Field of Search ................................ 370/432, 390, 370/412, 389, 396; 340/825.52

(56) References Cited

U.S. PATENT DOCUMENTS

| | | | | |
|---|---|---|---|---|
| 5,519,707 A | * | 5/1996 | Subramanian et al. | 370/399 |
| 5,586,267 A | * | 12/1996 | Chatwani et al. | 709/223 |
| 5,600,635 A | * | 2/1997 | Hamaki et al. | 370/280 |
| 5,634,011 A | * | 5/1997 | Auerbach et al. | 709/242 |
| 5,687,393 A | * | 11/1997 | Brown et al. | 710/29 |
| 6,266,339 B1 | * | 7/2001 | Donahue et al. | 370/432 |
| 6,272,134 B1 | * | 8/2001 | Bass et al. | 370/390 |
| 6,310,879 B2 | * | 10/2001 | Zhou et al. | 370/397 |
| 6,330,238 B1 | * | 12/2001 | Ooe | 370/390 |

FOREIGN PATENT DOCUMENTS

WO    WO 99/03255    1/1999

OTHER PUBLICATIONS

C. Hedrick, "Routing Information Protocol," RFC 1058, Jun. 1988, pp. 1–29.
R. Droms, "Dynamic Host Configuration Protocol," RFC 1541, Oct. 1993, pp. 1–34.

* cited by examiner

Primary Examiner—Ajit Patel
Assistant Examiner—Chirag Shah
(74) Attorney, Agent, or Firm—Gardere Wynne Sewell LLP

(57) ABSTRACT

A method for sending messages to multiple locations in a control system is provided. The method includes defining a set of a plurality of locations in the control system. This set is capable of being dynamically changed to add and remove locations from the set. The method further includes executing an instruction to send a message to the set in order to send the message to each location in the set.

13 Claims, 3 Drawing Sheets

METHOD AND SYSTEM FOR SENDING MESSAGES TO MULTIPLE LOCATIONS IN A CONTROL SYSTEM

TECHNICAL FIELD OF THE INVENTION

This invention relates generally to control systems and more particularly to a method and system for sending messages to multiple locations in a control system.

BACKGROUND OF THE INVENTION

Through the use of a control system, various equipment or appliances in an environment, such as a home or business, can be computer-controlled to form an automated environment. The controlled equipment may include heating, ventilation and air conditioning (HVAC) systems, lighting systems, audio-visual systems, telecommunications systems, security systems, surveillance systems, and fire protection systems, for example. The equipment may be coupled to equipment controlling devices that are linked to a computer-based master controller through the use of a control area network. One or more user interface devices, such as a touch panel, may also be linked to the control area network to accept user input and display current system status.

In order for the master controller to communicate with and control the various user interfaces and equipment controlling devices, it is useful for the user interfaces and controlling devices to be addressable over the control area network. The address of the user interface or controlling device can then be used to send messages to and receive messages from the master controller and other devices.

SUMMARY OF THE INVENTION

The present invention provides a method and system for sending messages to multiple locations in a control system that addresses shortcomings of prior systems and methods.

According to one aspect of the invention, a method for sending messages to multiple locations in a control system is provided. The method includes defining a set of a plurality of locations in the control system. This set is capable of being dynamically changed to add and remove locations from the set. The method further includes executing an instruction to send a message to the set in order to send the message to each location in the set.

According to another aspect of the invention, a control system is provided that includes a control area network. A master controller is coupled to the control area network, and is running a control program. The control system further includes a number of devices coupled to the control area network. At least two of these devices are logically grouped in a set in the control program such that the master controller is operable to send a message to all devices in the set by sending a message to the set.

Embodiments of the invention provide numerous technical advantages. For example, in one embodiment of the invention, a message may be sent to several locations in a control system by simply directing the message to a set that is defined as including the locations. These locations can be devices in the system, channels or levels on the devices, device-channel pairs, device-level pairs, or any other appropriate type of location. Directing a message to a location set allows less code to be used then would be required to direct the message to each location in the set individually.

Other technical advantages of the present invention include the ability to dynamically change the contents of a location set. For example, as the controlled environment changes, locations can be added or deleted from a set as appropriate even while the control system is running. In addition, certain locations, such as devices, may have the capability to automatically add themselves to a set when they come on-line in the control system.

Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

Figure 1:
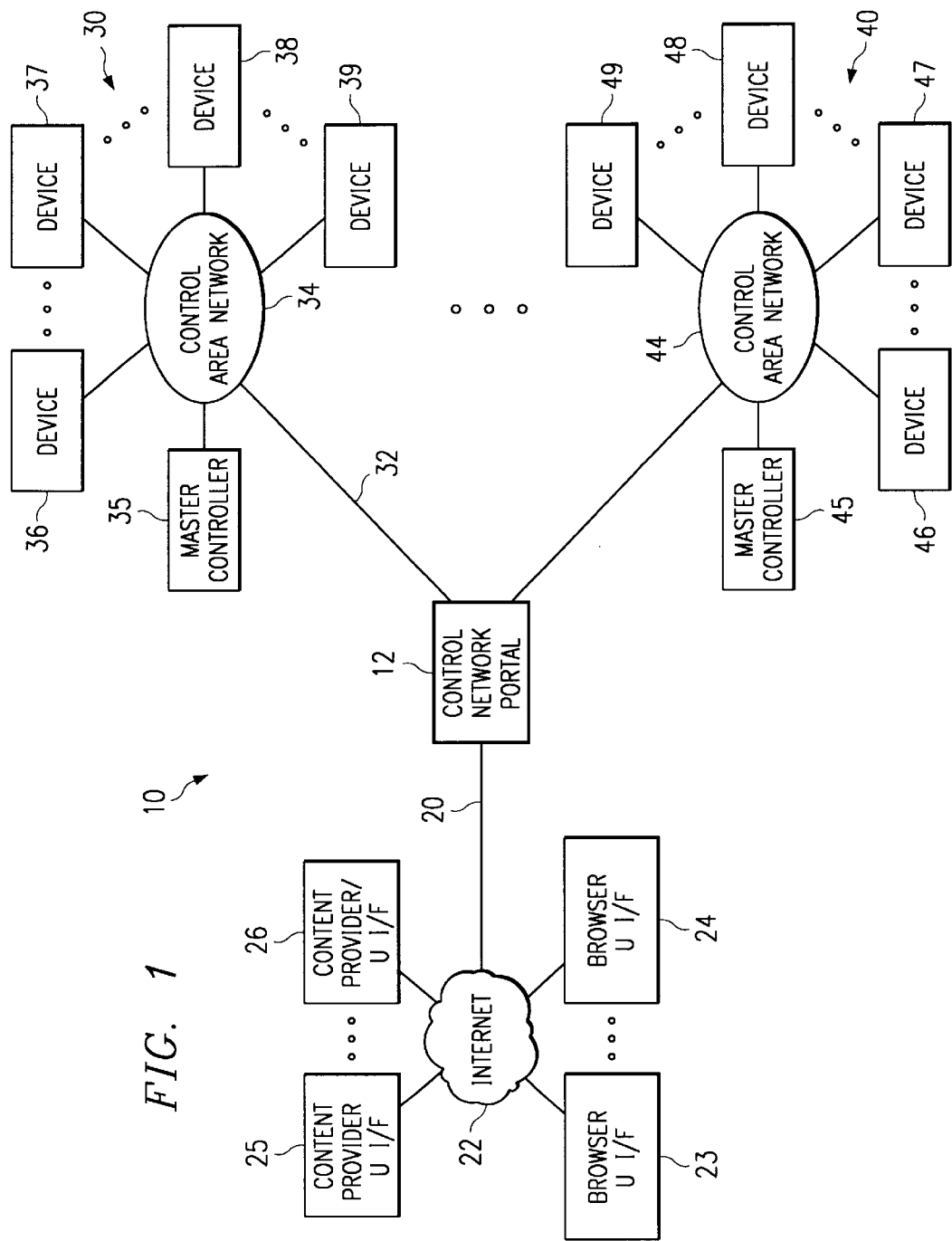
FIG. 1 is a top-level block diagram of an embodiment of an Internet control environment 10 constructed according to the teachings of the present invention.
Figure 2:
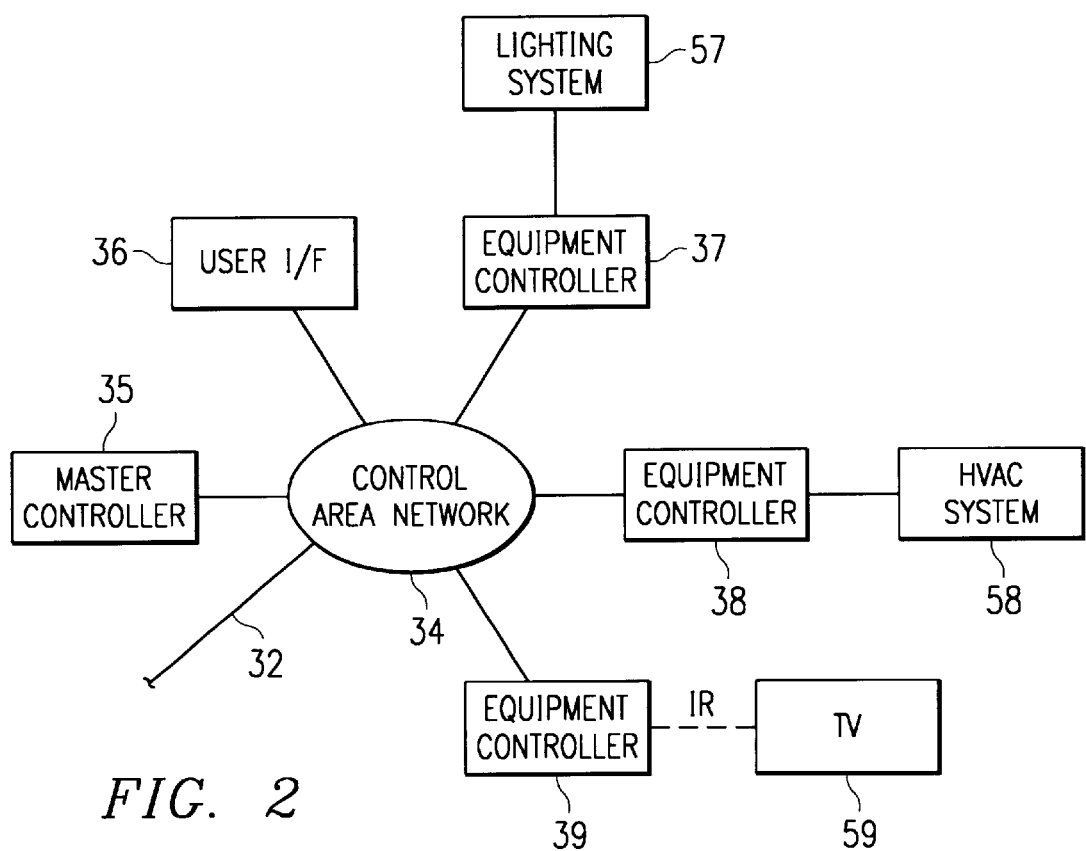
FIG. 2 is a block diagram of an embodiment of a control system constructed according to the teachings of the present invention.
Figure 3:
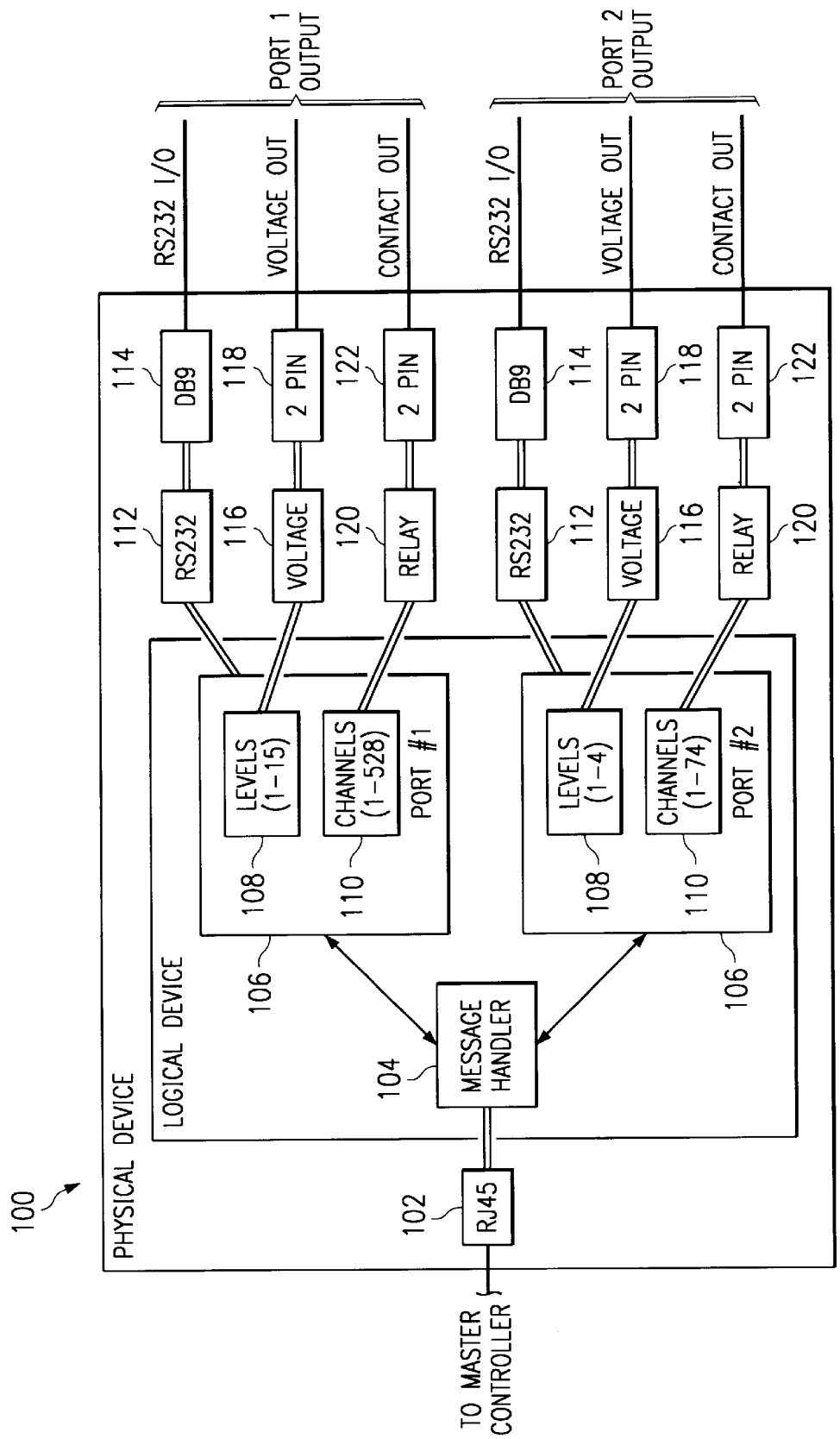
FIG. 3 is a detailed block diagram of an exemplary device of the control system of FIG. 2 according to the teachings of the present invention.

Embodiments of the present invention and its advantages are best understood by referring to FIGS. 1 through 3 of the drawings, like numerals being used for like and corresponding parts of the various drawings.

FIG. 1 is a top-level block diagram of an embodiment of an Internet control environment 10 constructed according to the teachings of the present invention. Internet control environment 10 comprises one or more control systems 30, 40 coupled to and capable of being controlled from the Internet. Each control system, for example, control system 30, contains a number of devices 36–39 that are coupled through a control area network 34 and controlled by a master controller 35. Each control system 30, 40 is coupled to the Internet through control network portal 12. In this application, the term 'Internet' is used to refer to an intranet, a wide area network (WAN), or the World Wide Web, and vice-versa.

The implications of employing Internet control environment 10 are the ability to communicate with and control one or more devices in control systems 30, 40 from the Internet, and the ability to control Internet devices 23–26 not directly coupled to a control area network. The geographical and communication protocol boundaries are transparent between a local control system and the Internet, so that the Internet, web information content providers and web browser applications become devices coupled to the various control systems.

The term 'device' refers to a component that can send control commands to and/or receive control messages from a master controller in a control system. Internet devices are specifically those devices coupled to a master controller through the Internet. Control area network devices (CAN devices) are those devices directly coupled to a master controller through a control area network. It should be understood that although interconnection of a control system with the Internet provides many advantages, each control system 30, 40 could exist as a separate entity with no connection to the Internet or any other control systems.

Control area networks 34, 44 of control systems 30, 40 are local area networks operating under transport protocols such as Ethernet, AXLink and PhastLink (the latter two developed by AMX Corporation of Dallas, Texas) that interconnect a variety of controllers, devices and equipment. The underlying network connectivity may be wired, wireless, power line carriers, or any suitable transmission medium. As described above, coupled to control area networks 34, 44 are a plurality of CAN devices 36–39, 46–49. To more specifically describe the types of devices that may be utilized, reference is now made to FIG. 2.

FIG. 2 shows an exemplary implementation of control system 30 of FIG. 1. Devices typically fall into one of two categories: user interfaces 36 or equipment controlling devices 37–39. Other devices that are neither user interfaces nor equipment controlling devices include radio frequency (RF) gateways for both one-way and two-way wireless devices, and the PC based tools used to configure and program the control system and its components.

User interface 36 may be any device that is capable of receiving user input and displaying or indicating control network status. For example, a touch panel, a computer terminal with a monitor, a keyboard and pointing device, or any other device with similar functionalities may serve as user interface 36. Although only a single user interface 36 is shown, a plurality of user interfaces may be implemented in control system 30. Furthermore, as described in detail below, using control area network portal 12, Internet applications are also capable of functioning as user interface devices without the use of custom and dedicated applications on the user's end.

Equipment controlling devices 37–39 are devices that can operate or act according to commands from master controller 35 to control various pieces of equipment 57–59 coupled there-to. Equipment controlling devices 37–39 need not be physically connected to the controlled equipment. For example, a infrared remote can be used to control an infrared-controlled VCR or TV. Types of controlled equipment 57–59 may include heating and air conditioning systems, lighting systems, video equipment, audio equipment, sprinklers, security cameras, infrared sensors, and smoke detectors. Household appliances, such as hot tubs, fireplaces, microwave ovens, washing machines and coffee makers may also be controlled equipment. It will be understood by one skilled in the art that many other types of equipment may also be controlled.

Equipment controlling devices 37–39 are also capable of providing master controller 35 with a current status on the operational state of the controlled equipment. These operational states may include power settings (on/off), temperature settings, current ambient temperature, light intensity settings, volume settings, threshold settings, and predetermined alphanumeric strings reflective of operational states. Once reported to master controller 35, these operational states may be displayed on the user interface(s) 36. It should also be understood that although only three equipment controlling devices 37–39 and three pieces of equipment 57–59 are shown in FIG. 2, any number of equipment interfaces controlling any number of pieces of equipment may be used.

As previously stated, the CAN devices (user interface 36 and equipment controlling devices 37–39) are controlled by master controller 35. Internet devices 23–26 (illustrated in FIG. 1), although not directly connected to control area network 34, may also be controlled by a master controller. When multiple master controllers are connected to control network portal 12, as depicted in FIG. 1, a single master controller (for example master controller 35) may be designated as the master controller for Internet devices 23–26. Alternatively, control network portal 12 may itself be a master controller that controls Internet devices 23–26.

Master controller 35 (as well as all other master controllers) is generally a CPU-based controller that controls communications among devices, such as between user interface 36 and equipment controlling devices 37–39. Each device has a unique address that allows master controller 35 to communicate with that device. In one embodiment of the invention, the address is comprised of a system number, a device number, and a port number. Master controller 35 is operable to receive user inputs, such as commands, received by user interface device 36 and to instruct the appropriate equipment controlling device(s) to act according to the command. Master controller 35 may also periodically poll each device 36–39 in control area network 34 to monitor the status of the device. The system status and/or the status of other devices may then be sent to user interface device 36 for display.

Returning to FIG. 1, master controllers 35, 45 are also operable to receive user input from devices on the Internet 22 via control network portal 12. Connected to Internet 22 are content providers 25, 26, which may function as Internet user interface devices. Content providers 25, 26 are typically web servers that generate and provide static and/or dynamic information and content in the form of web pages. Content provider applications executing on the web server are able to mine data stored in databases (not explicitly shown). The web pages are typically developed with hypertext markup language (HTML), and various other scripting languages and programming environments such as Microsoft Active Server Pages (ASP), Common Gateway Interface (CGI), Internet Server Application Programming Interface (ISAPI), JAVA, ActiveX, Cold Fusion, etc. that make the web pages more dynamic and interactive.

Also connected to Internet 22 are web browsers 23, 24 that may also serve as Internet user interface devices. Web browsers 23, 24 are application programs that can be used to request web pages from content providers 25, 26 and decode the web pages. Web browser applications include NETSCAPE NAVIGATOR and MICROSOFT INTERNET EXPLORER, for example. Typically, a user executes a web browser application on her personal computer and accesses the World Wide Web via a dial-up connection to an Internet service provider. The Internet or World Wide Web may also be accessed via other means such as cable modems and digital subscriber lines (DSL). The user makes a request for a particular web page or particular web site by entering or specifying a uniform resource locator (URL). The URL is associated with an Internet protocol (IP) address of the specified web site. Every computer connected to the World Wide Web and Internet has a unique IP address. This address is used to route message packets to specific computers and users. Internet protocol (IP) is the message transport and communications protocol of the Internet and World Wide Web.

When the web browser requests a certain URL, a connection is first established with a web server of a content provider that is addressed by the URL. A hypertext transport protocol (HTTP) request is then issued to the web server to download an HTML file. The web server receives the request and sends a web page file to the web browser, which decodes the file to display information in specified format on the screen. Web pages with dynamic content provided by gateway interfaces such as CGI and ISAPI are executable applications that are run by the web server upon user request. The executing gateway application is able to read parameter information associated with the request and generate an output in the form of an HTML file in response to the parameter values. Another way to add dynamic and interactive content to web pages uses ASP. ASP scripts are server-side executable scripts that are directly incorporated in the HTML web pages. Upon request for the page, the web server executes the ASP script in response to input parameter values and generates the web page with dynamic content.

Using control network portal 12, users may access control systems 30, 40 using web browsers 23, 24 accessing web pages provided by control network portal 12 or via value-added web pages provided by content providers 25, 26. For example, a user who has a control area network deployed in her luxury residence to control various aspects of the home environment may use a web browser application to remotely monitor her home. She may change the temperature setting to decrease energy use, for example, because she will be leaving on a business trip. She may also use the surveillance cameras to visually ensure that security has not been breached. She may even remotely program her VCR to record certain programs that will be broadcast while she is away. An example of value-added web pages provided by content providers is the provision of an interactive version of the television programming web page, www.tvguide.com. A user may request this web page, determine available program choices, and click on a certain program. Options may be provided to enable the user to turn on the television and tune it to a particular channel scheduled to broadcast the selected program, or to program the VCR to record the selected program.

Another example of value-added web pages provided by content providers is the provision of a secured web page that an electric company may access to slightly raise the temperature settings of the air conditioning systems of its participating customers in anticipation of high demand brown-out conditions. Yet another example is a web page that a security company may use to access, monitor and control the security, surveillance and fire protection systems of its customers.

FIG. 3 is a detailed block diagram of an exemplary device 100, such a CAN device or an Internet device as illustrated in FIG. 1. Device 100 includes a communication jack 102, which, in one embodiment is an RJ45 jack. For CAN devices, jack 102 is used to connect device 100 to the control area network. In operation, messages in a selected communications protocol, such as PhastLink+(developed by AMX Corporation) are received over communication jack 102 from the master controller. A message handler 104 is coupled to communication jack 102. The purpose of message handler 104 is to receive messages for device 100, and to send messages to the master controller and/or other devices from device 100. Once message handler 104 receives a message, it analyses the message header and sends the message to a logical port 106 to which it is addressed.

Each logical port 106 is logically connected to a physical port. In the illustrated embodiment, each physical port includes three elements: an RS-232 serial port 112, a voltage port 116, and a relay port 120 (the latter two elements are logically connected to levels 108 and channels 110, respectively, of logical port 106). RS-232 port 112 may use a nine pin electrical connector 114 as an external interface. Voltage port 116 and relay port 120 may use two pin connectors 118, 122. It will be understood that other types of physical port elements, such as other types of serial ports, parallel ports, or USB ports may also be included as elements of the physical port, along with any appropriate type of electrical interfaces. The physical port elements may use wireless external interfaces such as infrared signals, RF signals, or any other type of electromagnetic radiation or acoustic waves.

Logical ports 106 are discreetly addressable and allow control commands to be sent and received through a corresponding physical port element, such as RS-232 port 112. There can be multiple physical ports (and corresponding logical ports) in a device. For example, in a device capable of generating four IR outputs to control four controlled devices, each IR output may be linked to a physical port. Logical ports 106 can communicate with the controlled equipment and other external devices through the physical ports.

As part of each logical port 106, one or more channels 110 may be provided. A channel 110 can take on a binary value of either one or zero (on or off). Channels 110 are typically connected to a relay 120, which can be in an on or off condition. Relay 120 is connected to contact output 122, which allows any controlled equipment, or any component of the controlled equipment, that is coupled to contact output 122 to be turned on or off. Channels 110 may be bi-directional, and can be input channels, output channels, or input/output channels.

Input channels are typically generated in response to a user's action (e.g., pushing a power button on a user interface controlling a television). When an input channel is turned on (e.g., when the power button is pushed), a 'PUSH' event is generated for the Axcess$^2$ program running on the master controller. When the Input channel goes back off again (e.g., when the button is released), a 'RELEASE' event is generated. A separate input channel is typically assigned for each type of channel input that may be received by a particular logical port 106 on device 100. For example, other input channels on the "television" port might include those for receiving commands to toggle a picture-in-picture option or a surround sound option either on or off.

Output channels are typically generated in response to an input channel being turned on. An output channel usually operates relay 120 such that when the output channel goes on, the relay goes on. In this manner, output channels are used to turn controlled equipment, such as the television, on and off. There is typically a separate output channel for each controlled function (power, picture-in-picture, surround sound, etc.) Input/output channels are simply a combination of an input and an output channel. Instead of the input coming in on one channel, and a corresponding output leaving on another, the input and output use the same channel. For example, a power switch located on a television (as opposed to on a remote control) may be used to toggle the power on the television. Pressing the power button could generate an input channel, and the same channel could be used to operate relay 120 to output a signal to turn the television on.

Each logical port 106 also may, include one or more levels 108. Each level 108 in the illustrated embodiment is connected to a voltage regulator 116 to provide a voltage output. In many respects, levels are similar to channels. The difference between channels and levels is that levels can input or output any value (they are not limited to binary values, as with channels). For example, a level can be set to 100, 1000, 0, or almost any other value. Typical uses for levels include controlling an output of controlled equipment, such as a volume level or a light level. Levels may also be used to control the display of an output level of the controlled equipment on a user interface.

The following example illustrates the use of ports, channels, and levels to control a television coupled to device 100. A message is sent to device 100 from a user interface which instructs device 100 to turn on the television, set a volume level for the television, and then scroll some information across the television screen. The message is sent from the user interface to the master controller. The message is then forwarded by the master controller to device 100, where it is received through communications jack 102. The message is directed to message handler 104, which interprets the message and directs it towards the logical port 106 that is responsible for controlling the television.

The command to turn the television set on is sent to the appropriate channel 110 on that port 106, which would then control relay 120 to turn the television on (the television being connected to contact output 122 or another appropriate external interface). To set the volume level, the message command to set the volume at a certain value is sent to the appropriate level 108, which operates voltage regulator 116 to send a voltage corresponding to that value through voltage output 118 to the television. Finally, the scrolling message string is sent through RS-232 port 112 and displayed on the television connected to connector 114.

Messages sent in a control area network are typically addressed using a three-tier addressing scheme. The three tiers are the system number, the device number, and the port number. The highest level address tier is the system number. Each control system (usually comprising a number of devices controlled by a master controller) is assigned a unique number, and a message is first routed to the master controller of the system to which the message is being sent. Once the message is routed to the appropriate system, the device number is used to route the message to the appropriate device within that control system (if the message is directed to the master controller of the system, the device number is set to zero, and the message remains at the master controller). Finally, once the message reaches the destination device, the message handler of the device analyzes the message and forwards the command contained in the message to the proper logical port of the device. If appropriate, the command will be forwarded to a channel or level within that port.

During the operation of a control system, it may be necessary to send the same command to multiple devices simultaneously so that the controlled equipment coupled to those devices may be operated in unison. For example, assume that various lighting sources in a convention center meeting hall are part of a control system begin controlled by a master controller. There are numerous lighting sources in the meeting hall, and it is often desired that these lighting sources be operated in unison. For example, before a meeting starts, an operator may wish to turn all of the lights on in the meeting hall. One method of turning all of the lights on is to generate a 'power on' command for each lighting source (e.g., by pushing a power button on the user interface controlling each lighting source). Each 'power on' user input that is received by the master controller must then be responded to by sending an individual 'power on' command to each lighting source (e.g., by turning on the proper channel of the device controlling the lighting source).

Alternatively, and more efficiently, the devices responsible for controlling the lighting sources can be grouped into a device set. The device set is defined within the Axcess[2] control program running on the master controller. Once the appropriate devices have been grouped in a device set, a single command (such as a 'power on' command) can be directed to the device set, and the master controller will automatically send the command to every device in the set. In addition, a single button on a user interface may be associated with toggling the power on all of the lighting sources, such that when the button is pushed, a 'power on' (or 'power off') command is sent to the device set.

Similarly, commands can also be sent to the device set to simultaneously increase or decrease the light output of each lighting source (which would be sent to the appropriate level of each device in the set). It should be noted, however, that each lighting source may still be individually controlled by sending a command only to the device controlling that lighting source, and not to the device set. In this manner, the lights in the front of the room may turned off for a video presentation, while other lights are only dimmed (or left at their current lighting level). Once the presentation is over, all of the lights may be turned on (if necessary) and returned to the same lighting level by issuing a 'power on' command to the device set. In addition to the lighting sources, other equipment, such as projectors, microphones, and speakers, could also be grouped into sets for common control.

The contents of a device set can be changed dynamically while the control system is in operation and the control program is running. This is useful when devices need to be either added or deleted from a device set. For example, assume that the meeting hall described above has a dividing wall that can be used to divide the meeting hall into two smaller meeting rooms. When the divider is closed, it is not necessary or desired to have all of the lighting sources in both rooms operate simultaneously. Therefore, a sensor can be added to the control system to indicate when the divider is open or closed. The sensor can act as a input device having a channel over which the open or closed state of the divider is sent.

When the divider is closed, a corresponding message is sent from the sensor to the master controller. The Access[2] control program located on the master controller may then issue a command in response to this message that deletes the devices controlling the light sources in one of the rooms from the device set. The deleted devices may then be added to another device set, so that the lighting sources in each room are grouped in a device set. In this manner, the lights in each room can then be individually controlled as needed to meet the needs of the room's occupants. When the divider is again opened, the control sensor will send a corresponding message to the master controller, and the master controller will group all of the devices controlling the lighting sources in the undivided hall into a single device set. It will be understood that similar dynamic groupings may be used in numerous other situations. In addition, a device may have the capability to automatically include itself in a set when it comes on-line in the control system.

It should be noted that since the address of each message sent by the master controller contains a system number, a device number, and a port number, each "device" included in a device set is actually defined as a particular port on a device. If a device has more than one port, then different device names are used to represent different ports on the same device. This simply reflects the fact that a single device having three ports, for example, is analogous to three separate devices that each have one port.

The following is a description of how device sets are created and implemented using the Axcess[2] program provided by one embodiment of the present invention. It should be understood, however, that other methods of implementing the concept of device sets (as well as sets of other types of locations that will be described, such as channel sets, level sets, device-channel sets, and device-level sets) may be used without departing from the scope of the present invention. In order to create a device set, each "device" must be defined (through its system number, device number, and port number). The Define_Device section is used in the Axcess[2] program to define the available "devices" (a particular port on a particular device). An example of the use of the Define_Device section is as follows:

```
DEFINE_DEVICE
    LIGHT1 = 1:1:0  // device number = 1, port = 1, system = 0
    LIGHT2 = 1:2:0  // device number = 1, port = 2, system = 0
    LIGHT3 = 2:1:0  // device number = 2, port = 1, system = 0
    DIVIDER1 = 11:1:0  // device number = 11, port = 1, system = 0
```

Although the devices were defined above using a Device::Port:System (D:P:S) format, it should be noted that a device may also be defined as simply a device number (i.e. LIGHT3=2). In this case, the device is defined as the first port (port=1) on the device number indicated (here, device number=2), the device being located in the local system (system=0). Furthermore, a final alternative for defining a device is to use a device structure as follows:

```
Structure DEV
{
INTEGER Number      // device number
INTEGER Port        // port on device
INTEGER System      // system device belongs to
}
```

Once the appropriate devices have been defined, the devices can be grouped into device sets as needed. Device sets are declared in the DEFINE_VARIABLE section of the program in one of two ways:

DEVSET DSName={$Dev_1, Dev_2, \ldots, Dev_n$}

OR

DEVSET DSName [MaxLen]={$Dev_1, Dev_2, \ldots, Dev_n$}

Each device name that appears on the right-hand side of the DEVSET declaration must be defined as a device in the DEFINE_DEVICE section. The first statement above declares a device set whose maximum length is determined by the number of elements initially on the right-hand side of the equation. The second form uses 'MaxLen' to specify the maximum length of the device set. Two examples of a device set that includes three of the devices defined above are as follows:

DEVSET LIGHTGROUP={LIGHT1, LIGHT2, LIGHT3}

OR

DEVSET LIGHTGROUP [3]={LIGHT1, LIGHT2, LIGHT3}

As mentioned above, device sets can be dynamically increased or decreased by adding or subtracting devices. To add a device to a set at run-time, one of the following command forms may be used:

MyDeviceSet+=DeviceSet

OR

MyDeviceSet+=Device where 'MyDeviceSet' and 'DeviceSet' are defined device sets and 'Device' is a single defined device. The '+=' operator adds the element on the right side of the operator to the element on the left side of the operator, and redefines the element on the left side as this sum. Provided there is room in the set to hold the additional device(s), the effective length of 'MyDeviceSet' is automatically adjusted. If the device set is full the command is ignored and 'MyDeviceSet' remains unchanged.

The following commands may be used to remove an element(s) from a device set:

MyDeviceSet-=DeviceSet

OR

MyDeviceSet-=Device

The '-=' operator subtracts the element on the right side of the operator from the element on the left side of the operator. The target device set (the set being operated on) is searched for the specified device or set of devices. If a set is specified, the devices must appear in contiguous order in the target for the removal to succeed. Once the device or set is removed, the remaining devices are shifted to fill any vacancy created and the device set length is updated to match the number of elements remaining. If more than one occurrence of the specified device or set is found, only the first one is removed.

The individual elements in a device set can be referenced by their defined names (LIGHT1, LIGHT2, etc.) or alternatively, by using array notation with the device set name. For example, the third device in the device set, MyDeviceSet would be referenced by MyDeviceSet[3]. A device set also has a property named 'Last' which indicates the index of the last member of the set for which an event notification was received. This property is accessed in one embodiment of the present invention using the dot-operator syntax: 'MyDeviceSet.Last' The 'Last' property is useful for determining which device in a set a particular notification message is in reference to.

As mentioned above, one of the primary uses of device sets is to allow a message to be sent to a plurality of devices without having to write code to send the message to each individual device. The following is a code usage example where a device set is created and a command is sent to the device set:

DEVSET LIGHTGROUP={LIGHT1, LIGHT2, LIGHT3}

Send_Command LIGHTGROUP, 'RT5'

The command above sends 'RT5' to all devices in the LIGHTGROUP device set. The 'RT5' command instructs the equipment controllers controlling three lighting sources set the time zero to maximum intensity to five seconds. As mentioned above, devices in a device set may also be addressed individually using one of the following commands (using device LIGHT3 as an example):

Send_Command LIGHTGROUP[3], 'RT5'

OR

Send_Command LIGHT3, 'RT5'

Besides device sets, embodiments of the present invention also allow for sets of other types of locations: channel sets, device-channel sets, level sets, and device-level sets. A channel set is simply an identifier that names a group of channels. A channel set may be used anywhere a channel specification is required in order to specify a group of channels on the same device that are the target or source for a specified command or instruction. For example, when controlling an air conditioning system, it may be useful to simultaneously turn on a compressor and a blower when the temperature rises above a certain level. If the power to the compressor and blower is toggled using different channels of the same device (and port), then a channel set can be used to combine these two channels. Therefore, a single command to "turn on" the channel set will turn on both channels controlling the power settings of the blower and the compressor.

As with device sets, channel sets are declared in the DEFINE_VARIABLE section of the Access² control program in one of two ways:

CHANSET CSName={Chan$_1$, Chan$_2$, . . . , Chan$_n$}
OR
CHANSET CSName[MaxLen]={Chan$_1$, Chan$_2$, . . . , Chan$_n$}

These methods of defining a channel set are analogous to the methods of defining a device set, and thus will not be described in further detail. Likewise, channels and/or channel sets may be added to or deleted from an existing channel in the same manner as described above in relation to device sets.

Like channel sets, level sets group related sets of levels. A level set may be used anywhere a level specification is required in order to specify a group of levels in a particular device that are the target or source for a specified command or instruction. For example, when the brightness level of two lighting sources is controlled by different levels on the same device (and port), a level set may be defined so that the brightness of both lights may be simultaneously increased or decreased by directing a command to the level set.

Level sets are declared in the DEFINE_VARIABLE section of the program in one of two ways:

LEVSET LSName={Level$_1$, Level$_2$, . . . . , Level$_n$}
OR
LEVSET LSName [MaxLen]={Level$_1$, Level$_2$, . . . , Level$_n$}

Again, like channel sets, these methods of defining a level set are analogous to the methods of defining a device set, and thus will not be described in further detail. Likewise, levels or level sets may be added to or deleted from an existing level in the same manner as described above in relation to device sets.

Channel sets and level sets are useful to simultaneously address several channels in a particular device, however, they are restricted to use in grouping channels or levels on the same device (and port). In order to simultaneously direct commands to channels on different devices, a device-channel set is used. Likewise, a device-level set may be used to simultaneously direct a command to levels on different devices.

A device-channel set is an array of device-channel pairs. A device-channel set can be used anywhere a [Device, Channel] specification is required with the result of providing a range of targets for the command or instruction where it is used. For example, the command 'On[DEVCHANSET]' would turn on the channels designated in the device-channel set. Such a command could be used to turn on various lighting sources controlled by different (or the same) devices. Each element of a device-channel pair is represented internally as a DEVCHAN structure. This structure combines the fields of a DEV structure representing the device with a field representing the channel number as follows:

Structure DEVCHAN
{
DEV    Device
INTEGER    Channel
}

A device-channel set is declared in the DEFINE_VARIABLE section of the Access² control program in one of two ways:

DEVCHANSET DCSName={[Dev$_1$,Chan$_1$], [Dev$_2$, Chan$_2$], . . .}
OR
DEVCHANSET DCSName[MaxLen]={[Dev$_1$,Chan$_1$] [Dev$_2$,Chan$_2$], . . . }

The first statement declares a DEVCHANSET whose maximum length is determined by the number of elements in the initial set on the right-hand side. The second form uses 'MaxLen' to specify the maximum length of the set.

When specifying a device-channel pair, each pair is enclosed in square brackets. The first component of a device-channel pair (Dev$_n$) represents the device number, port number, and system number, and can be specified as either a single device number, a constant DEV structure, or as a D:P:S specification (as described above in relation to DEFINE_DEVICE). Each device specified in a device-channel pair must be defined in the DEFINE_DEVICE section. Channels are expressed as integer constants. For example, "[1, 3]", "[LIGHT1, 3]" and "[1:1:0, 3]" are all valid representations of device-channel pairs.

The process of adding or removing device-channel pairs or device-channel sets from an existing device-channel set are analogous operations to those performed in conjunction with device sets (through the use of '+=' and '−=' operators). Therefore, they will not be discussed in further detail. The individual elements of a DEVCHANSET can be referenced by their defined names or, alternatively, by using array notation with the device-channel set name. For example, the third element in the device-channel set, MyDCSet would be referenced by MyDCSet[3]. Furthermore, since a DEVCHANSET is an array of DEVCHAN structures, DEVCHAN members can be referenced using the dot operator notation such as 'MyDCSet[3].Device' or 'MyDCSet[1].Device.Channel'

Similar to a device-channel set, a device-level set is an array of device-level pairs. A device-level set can be used anywhere a [Device, Level] specification is required with the result of providing a range of targets for the command or instruction where it is used. For example, the command 'On[DEVLEVSET]' would turn on the levels designated in the device-level set. Such a command could be used to change the brightness level of various lighting sources controlled by different (or the same) devices. Each element of a device-level set is represented internally as a DEVLEV structure. This structure combines the fields of a DEV structure representing the device with a field representing the level number as follows:

Structure DEVLEV
{
DEV    Device
INTEGER    Level
}

A DEVLEVSET is declared in the DEFINE_VARIABLE section in one of two ways:

DEVLEVSET DLName={[Dev$_1$,Level$_1$], [Dev$_{2,Level2}$], . . . }
OR
DEVLEVSET DLName[MaxLen]={[Dev$_1$,Level$_1$], [Dev$_2$, Level$_2$], . . . }

In a particular embodiment, when specifying a device-level pair, each pair is enclosed in square brackets as shown above. The first component of a device-level pair (Dev$_n$) represents the device number, port number, and system number, and can be specified as either a single device number, a constant DEV structure, or as a D:P:S specification. Each device specified in a device-level pair must be defined in the DEFINE_DEVICE section. The second component is the level number on the device. The level number is expressed as an integer constant. For example, "[1, 8]", "[LIGHT1, 8]" and "[1:1:0, 8]" are all valid representations of device-level pairs.

The process of adding or removing device-level pairs or device-level sets from an existing device-level set are analogous operations to those performed in conjunction with device sets (through the use of '+=' and '−=' operators). Therefore, they will not be discussed in further detail. In addition, as with device-channel sets, the individual elements of a level set can be referenced by their defined names, or alternatively, by using array notation with the device-level set name.

In addition to sets, the Axcess$^2$ program can also "link" devices through the use of the DEFINE_COMBINE program section. The section is typically used to define a combination of functionally identical devices, such as identically programmed touch panels. When the program references one of these devices, all other combined devices in the set are also referenced. The first device in a DEFINE_COMBINE list (the primary device) is typically a virtual device. A virtual device is a device that does not actually exist in the control system, but merely logically represents one or more physical devices. By specifying a virtual device as the primary device in a DEFINE_COMBINE statement, Axcess$^2$ code can be written that targets only the virtual device, but that has the effect of operating on each physical device that has been linked to the virtual device through a DEFINE_COMBINE statement. An example of two DEFINE_COMBINE statements are as follows:

DEFINE_COMBINE (VDevice, Panel1, Panel2, Panel3)

(VDevice, DevSet)

The first statement above combines three touch panel devices (user interfaces): Panel1, Panel2 and Panel3. Whenever an input is received on any of these three devices, the Axcess$^2$ code detects the input as coming from VDevice (the virtual device). For example, if 'Button 5' on Panel3 is pressed, Axcess$^2$ considers the input as coming from 'Button 5' on VDevice as a result of the combination. Output changes (including channel changes and level changes) sent to the virtual device or any device in the set will automatically be sent to all devices in the list. For instance, ON[VDevice, 50] will turn on channel fifty on all three touch panels, and OFF[Panel3, 10] will turn off channel ten on all three panels.

The second statement above is equivalent to the first except for the use of a device set (DevSet) instead of a list of individual devices (Panel1, Panel2, and Panel3). Any input events for any device in the device set will appear to the program as coming from the virtual device. Output changes directed to the virtual device or any device in the set will be sent to all devices in the set. Assuming the device set includes Panel1, Panel2, and Panel3, the above two statements will have the same effect. However, an advantage of using a device set instead of individually naming each device, is that the device set can be manipulated dynamically at run-time to add or remove devices (as discussed above). A device that is added to the set is combined with the others, and a device that is removed from the set is uncombined. Unlike adding or removing devices from a list of individual devices in a DEFINE_COMBINE statement, the process of adding or removing devices to a device set does not require the system to be powered down and restarted.

Although the present invention and its advantages have been described in detail, it should be understood that various changes, substitutions, and alterations can be made therein without departing from the spirit and scope of the present invention as defined by the appended claims.

What is claimed is:

1. A method for sending messages to multiple locations in a control system that includes a plurality of master controllers, each master controller controlling a plurality of devices and having a corresponding system number, said method comprising the steps of:

defining a set of locations by sequentially addressing each of a plurality of locations in said control system, a given one of said locations being sequentially addressed by first indicating the system number of a particular master controller, then indicating the device number of a selected device controlled by the particular master controller, and finally indicating the port number of a selected port associated with the selected device;

changing the set at selected intervals by dynamically adding and removing locations from the set; and executing an instruction to send a single message to the set, in order to send the same single message to each of the plurality of locations in the set.

2. The method of claim 1, wherein:

said message comprises a command that is sent simultaneously to each of said locations in said set.

3. The method of claim 1, wherein:

the set of locations includes different channels of a device located in the control system; and a message is sent to different locations by toggling a binary value of each channel.

4. The method of claim 1, wherein:

the contents of the set of locations are dynamically changed by adding a new location to the set based on an association of the new location with the existing set of locations.

5. The method of claim 1, wherein:

the contents of the set of locations are dynamically changed by deleting a location from the set based on a disassociation of the location from the other locations in the set.

6. The method of claim 1, wherein:

said set of locations is defined in a control program executing on a master controller of the control system.

7. The method of claim 1, wherein:

each of said ports has at least one channel or one level, selectively.

8. The method of claim 1, wherein:

said set of locations is defined by different levels of one or more of said devices located in the control system.

9. The method of claim 8, wherein:

a message is sent to each location by sending a level value to each level in said set.

10. The method of claim 1, wherein:

said set of locations is defined by a number of device-channel pairs, each device-channel pair representing a channel of one device or different devices, selectively, located in the control system.

11. The method of claim 10, wherein:

a message is sent to each location by toggling a binary value of the channel of each device-channel pair in said set.

12. The method of claim 1, wherein:

said set of locations is defined by a number of device-level pairs, each device-level pair representing a level of one device or different devices, selectively, located in the control system.

13. The method of claim 12, wherein:

a message is sent to each location by sending a level value to each level in said set.

* * * * *